United States Patent
Tanemura et al.

(10) Patent No.: US 7,253,385 B2
(45) Date of Patent: Aug. 7, 2007

(54) MICROSCOPE IMAGE ACQUIRING SYSTEM WITH SEPARATE MICROSCOPE AND IMAGING INSTRUMENT CONTROLLERS THAT OPERATE COOPERATIVELY

(75) Inventors: Takashi Tanemura, Zushi (JP); Tomotaka Shinoda, Kita (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/182,795

(22) Filed: Jul. 18, 2005

(65) Prior Publication Data

US 2005/0248764 A1  Nov. 10, 2005

Related U.S. Application Data

(63) Continuation of application No. PCT/JP2004/002528, filed on Mar. 2, 2004.

(30) Foreign Application Priority Data

Mar. 3, 2003  (JP)  ............................. 2003-055975

(51) Int. Cl.
  *G02B 27/40*  (2006.01)
  *G02B 27/64*  (2006.01)
  *G02B 7/04*  (2006.01)
(52) U.S. Cl. ................. 250/201.3; 250/234; 359/363
(58) Field of Classification Search ............ 250/201.3, 250/234–236; 359/368–398
  See application file for complete search history.

(56) References Cited

U.S. PATENT DOCUMENTS 6,052,223 A    4/2000  Yoneyama et al.
6,495,818 B1*  12/2002  Mao ............................ 250/226
6,711,283 B1*  3/2004  Soenksen .................... 382/133
2001/0045506 A1*  11/2001  Masuyama ............... 250/201.3

FOREIGN PATENT DOCUMENTS

| JP | A 9-189849 | 7/1997 |
| JP | A 11-84262 | 3/1999 |
| JP | A 11-95125 | 4/1999 |
| JP | A 11-295612 | 10/1999 |
| JP | A 2002-267943 | 9/2002 |

* cited by examiner

*Primary Examiner*—Georgia Epps
*Assistant Examiner*—Patrick J. Lee
(74) *Attorney, Agent, or Firm*—Oliff & Berridge PLC

(57) ABSTRACT

A microscope digital image acquiring system 1 includes a microscope 2 composed of a microscope unit 10 forming an enlarged image of an object O and a microscope controller 20 controlling movement of the microscope unit 10, an imaging instrument 3 composed of a camera head unit 30 that is attached to the microscope 2 and has an imaging device detecting the enlarged image of the object O and a camera controller 40 that receives a detected signal output from the imaging device and outputs image information of the object O. The microscope controller 20 and the camera controller 40 operate cooperatively in response to control commands sent externally. The system 1 has a connecting cable 52 connecting with both instruments 20 and 40 to carry out communication with each other. Both instruments 20 and 40 operate cooperatively by communicating control commands with each other through the connecting cable 52.

17 Claims, 14 Drawing Sheets

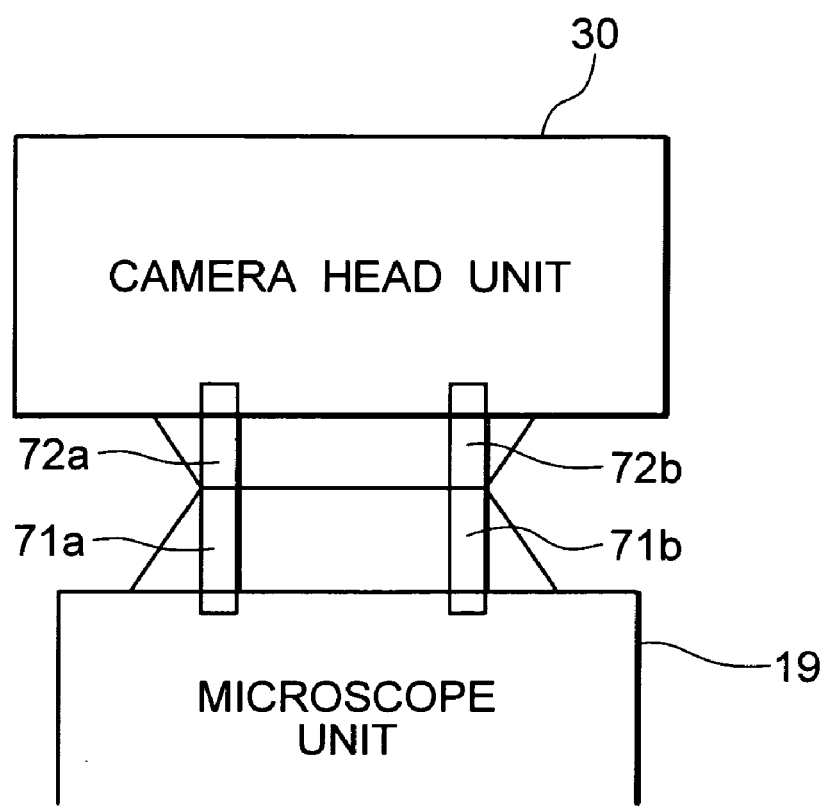

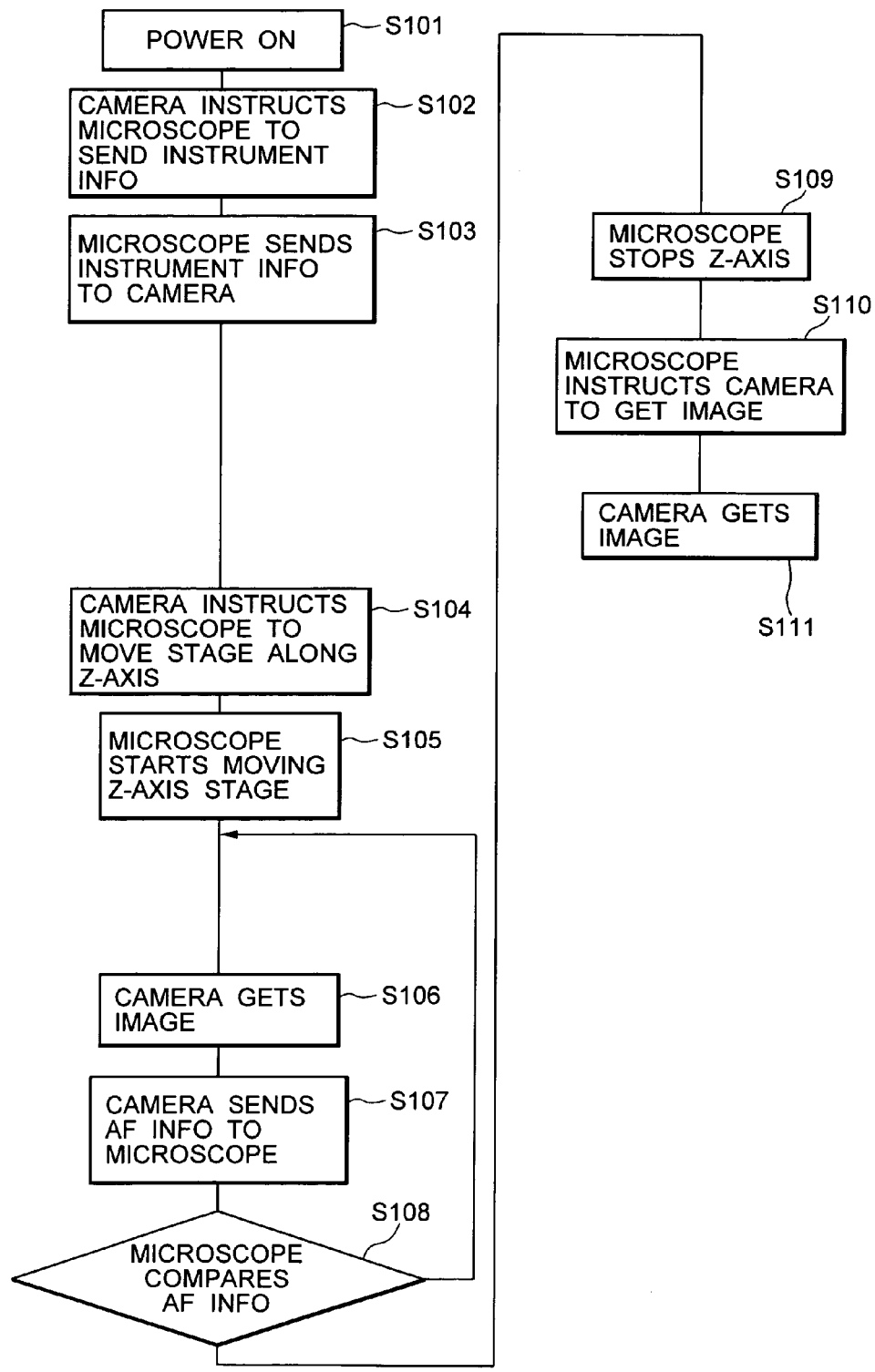

MICROSCOPE IMAGE ACQUIRING SYSTEM WITH SEPARATE MICROSCOPE AND IMAGING INSTRUMENT CONTROLLERS THAT OPERATE COOPERATIVELY

This is a Continuation of Application No. PCT/JP04/002528 filed Mar. 2, 2004. The entire disclosure of the prior application is hereby incorporated by reference herein in its entirety.

TECHNICAL FIELD

The present invention relates to a microscope digital image acquiring system composed of a microscope and an imaging instrument.

BACKGROUND ART

As shown in FIG. 14, a microscope digital image acquiring system is composed of a microscope 83 and an imaging instrument 86. The microscope 83 is constructed by a microscope unit 81 forming an optical system and imaging an enlarged image of an object and a microscope controller 82 controlling the optical system of the microscope unit 81 to focus on the object by using an AF unit 95. The imaging instrument 86 is constructed by a camera head unit 84 that is attached to the microscope 83 and includes an imaging device (such as a CCD) for detecting the enlarged image of the object and a camera controller 85 that processes the signal detected by the imaging device to output imaging information. Each of the microscope 83 and the imaging instrument 86 is connected with an external controller such as a computer 87 which controls the microscope 83 and the imaging instrument 86 to obtain a digital image of the object. In this case, these instruments 83, 86, and 87 have power cables 92, 93, and 94, respectively, and a lot of connecting cables 88, 89, 90, and 91 connect these instruments with each other.

Processes carried out by the computer 87 to obtain a digital image from the microscope 83 are shown in FIG. 15. After supplying power in step S160, processes that the computer 87 collects instrument information of the microscope 83 in steps S161 and S162, processes that the computer 87 collects instrument information of the imaging instrument 86 in steps S163 and S164, processes that the computer 87 sends a control command to the microscope controller 82 to control the microscope unit 81 to make the optical system focus on the object on the basis of the instrument information in steps S165 through S173, and processes that the computer sends a control command to the camera controller 85 to obtain image information of the object in steps S174 and S175 are carried out with exchanging data (control command) between a lot of instruments, so that a lot of processes are carried out simultaneously.

A microscope digital image acquiring system is disclosed in Japanese Patent Application Laid-Open No. 11-95125 in which a microcomputer carries out a lot of processes simultaneously as same as the above-described case.

However, in the disclosure of Japanese Patent Application Laid-Open No. 11-95125, since a microcomputer in an image processor has to frequently communicate with a microscope control unit, a frame memory, and a camera control unit and carries out processes, so that it has been feared that response and operability become worse and processing speed becomes slow.

DISCLOSURE OF THE INVENTION

The present invention is made in view of the aforementioned problems and has an object to provide a microscope digital image acquiring system constructed by connecting a microscope controller and a camera controller by a communication means to exchange control command with each other so as to operate the microscope controller and the camera controller cooperatively resulting in obtaining high processing speed.

In order to achieve the object, the microscope digital image acquiring system according to the present invention includes a microscope that is composed of a microscope unit that is constructed by an optical system forming an enlarged image of an object, and a microscope controller that is connected to the microscope unit and controls movement of the microscope unit, an imaging instrument that is composed of a camera head unit that is attached to the microscope and has an imaging device detecting the enlarged image come out from the optical system, and a camera controller that is connected to the camera head unit, receives a detected signal output from the imaging device, and outputs image information of the object, a movement instruction means (for example, the operating section 22 in the embodiment) that carries out movement instruction to the system, and a communication means (for example, the connecting cable 52 in the embodiment) that is connected to the camera controller and the microscope controller and carries out communication between the camera controller and the microscope controller. It is preferable that on the basis of the instruction by the movement instruction means, the camera controller and the microscope controller operate cooperatively by sending control commands of instructed movement with each other through the communication means.

It is preferable that the microscope controller and the camera controller operate on the basis of the control command sent externally.

It is preferable that the camera controller controls the movement of the microscope unit by sending the control command to the microscope controller.

It is preferable that the microscope unit has a focusing instrument (for example, the sample stage drivers 14 in the embodiment) that makes the optical system focus on the object, and the microscope controller has a focusing function that makes the optical system focus on the object by controlling the movement of the focusing instrument on the basis of the control command, and the camera controller calculates focusing information for focusing the optical system from the detected signal obtained from the camera head unit and makes the optical system focus on the object by the focusing function by sending the control command to the microscope controller on the basis of the focusing information.

It is preferable that the microscope unit has an illumination means (for example, the light source controller 11 in the embodiment) for illuminating the object and the microscope controller has an illumination adjusting function that adjusts illuminance by controlling the illumination means on the basis of the control command, and the camera controller calculates light intensity information for adjusting illuminance of the illumination means from the detected signal obtained from the camera head unit, sends the control command to the microscope controller on the basis of the light source information, and adjusts illuminance by the illumination adjusting function.

It is preferable that the microscope controller sends the control command to the camera controller, obtains the detected signal from the camera head unit, and processes the detected signal.

It is preferable that the microscope unit has a focusing instrument that makes the optical system focus on the object, and the camera controller has a focusing information calculating function that calculates focusing information for making the optical system focus on the object from the detected signal obtained from the camera head unit on the basis of the control command, and the microscope controller sends the control command to the camera controller, makes the camera controller calculate the focusing information by the focusing information calculating function, and controls the movement of the focusing instrument on the basis of the focusing information to make the optical system focus on the object.

It is preferable that the microscope unit has an illumination means for illuminating the object, and the camera controller has a light source intensity information calculating function that calculates light source intensity information for adjusting illuminance of the illumination means from the detected signal obtained from the camera head on the basis of the control command, and the microscope controller sends the control command to the camera controller, makes the camera controller calculate the light source intensity information by the light source intensity information calculating function, and adjusts illuminance on the basis of the light source intensity information.

In the microscope digital image acquiring system constructed as described above, it is preferable that the communication means has a pair of connectors, one of the connectors is arranged on the microscope, and the other connector is arranged on the imaging instrument, and the system is constructed such that upon connecting the imaging instrument to the microscope, the communication means is connected by the connectors.

It is preferable that the communication means is constructed by a USB cable.

It is preferable that the camera controller has an internal memory or an external memory or both, and the camera controller stores in the internal memory or the external memory the instrument information of the imaging instrument and that of the microscope obtained through the communication means in connection with the image information.

It is preferable that the microscope controller obtains a firmware for the microscope controller stored in the internal memory or the external memory in advance through the communication means and rewrites the firmware of the microscope controller.

It is preferable that each of the microscope and the imaging instrument has an initial setting means that carries out initial setting by exchanging unit ID with each other by using the communication means.

It is preferable that the imaging instrument has a first interface that receives the control command from the movement instruction means and a second interface that sends the control command to the microscope.

It is preferable that the imaging instrument controls the camera head unit in response to the control command to detect an enlarged image of the object, and controls the microscope through the second interface.

It is preferable that the microscope has a fourth interface that receives the control command from the movement instruction means, and a third interface that sends the control command to the camera head unit.

It is preferable that the microscope controls the movement of the microscope in response to the control command to form an enlarged image of the object, and controls the imaging instrument through the third interface.

It is preferable that the microscope has a fourth interface that receives the control command from the movement instruction means, a third interface that sends the control command to the camera head unit, and a signal line that directly connects the second interface and the third interface, and the imaging instrument and the microscope operate cooperatively.

BRIEF DESCRIPTION OF THE DRAWINGS

FIG. 7 is a block diagram showing a connector arranged between a camera head unit and a microscope.

FIG. 9 is a flowchart showing processes according to a first embodiment of the present invention.

EMBODIMENTS OF THE INVENTION

Preferred embodiments are explained below with reference to accompanying drawings.

Figure 1:
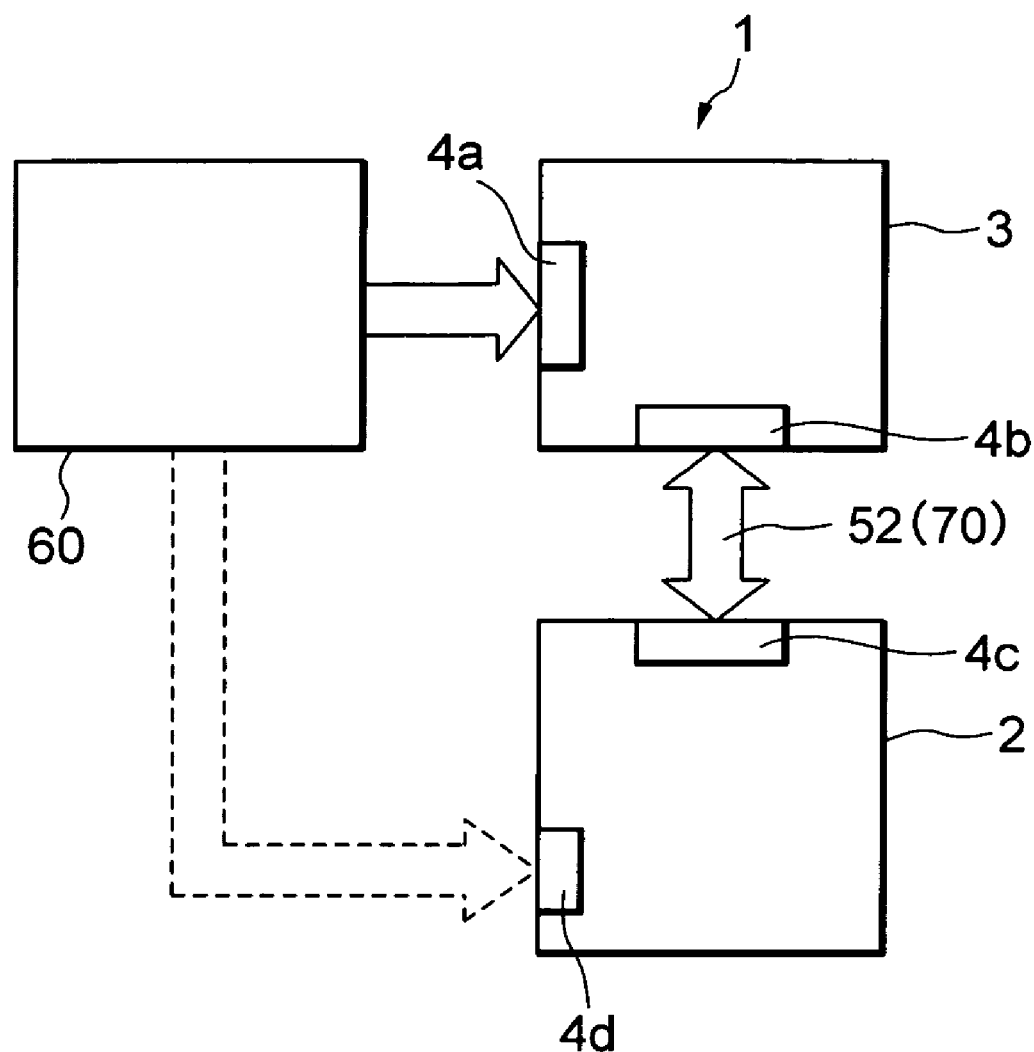
FIG. 1 is a schematic diagram showing a microscope digital image acquiring system according to the present invention.

FIG. 1 is a schematic diagram showing a microscope digital image acquiring system according to the present invention.

In FIG. 1, a microscope digital image acquiring system 1 is composed of a microscope 2 explained later, and an imaging instrument 3 explained later that detects an image of an object come out from the microscope 2 and outputs image information. In addition to them, an external controller 60, explained later, that controls movements of the microscope 2 and the imaging instrument 3 is arranged.

The imaging instrument 3 is equipped with a first interface 4a that receives a control command from the external controller 60 and a second interface 4b that sends a control command to the microscope 2 via the imaging instrument 3. A signal line (explained later as 52) directly connecting the second interface 4b and a third interface 4c is arranged to connect the external controller 60, the imaging instrument 3, and the microscope 2 in series, so that the second interface 4b and the third interface 4c can communicate a control command between the external controller 60 and the microscope 2 via the imaging instrument 3.

As another connection state, a fourth interface 4d that receives a control command from the external controller 60 may be arranged on the microscope 2 in series so as to flow the control signal in order from the external controller 60, the microscope 2, and to the imaging instrument 3 (shown in FIG. 1 by broken line).

Figure 2:
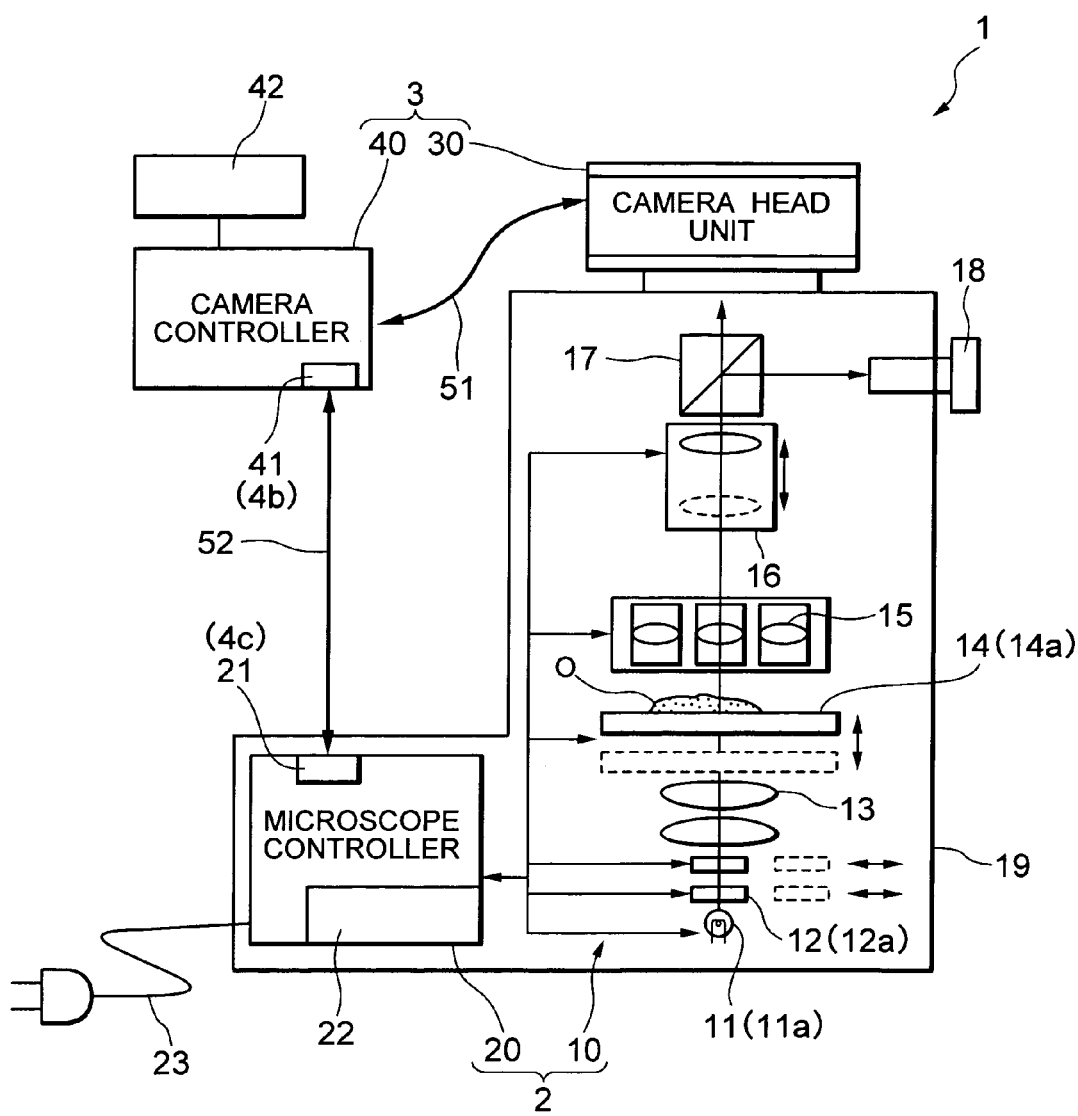
FIG. 2 is a block diagram showing construction of the microscope digital image acquiring system according to the present invention.

As shown in FIG. 2, the microscope 2 and the imaging instrument 3 can operate cooperatively even if the external controller 60 is not exist. Moreover, the microscope 2 and the imaging instrument 3 can be controlled by a control command by the external controller 60 as shown in FIG. 5. The first through fourth interfaces 4a, 4b, 4c, and 4d have connectors to respectively connect the microscope 2, the imaging instrument 3, and the external controller 60 to a communication means. By using the connector (explained later as 72) for the second interface 4b and the connector (explained later as 71) for the third interface 4c, the microscope 2 and the imaging instrument can be removably constructed.

Embodiments of the present invention are explained below in detail.

In FIG. 2, a microscope digital image acquiring system 1 is composed of a microscope 2 that forms an enlarged image of an object (specimen) o to be observed and an imaging instrument 3 that detects an image of the object o come out from the microscope 2 and outputs image information.

The microscope 2 is composed of a microscope unit 10 that constructs an optical system forming the enlarged image of the object o and a microscope controller 20 that controls movements of the microscope unit 10. The microscope unit 10 is composed of an illumination light source 11a for observing the object o, a light source controller 11 that controls illuminance and the like of the illumination light source 11a, a filter 14d for adjusting the illumination light, filter changers 12 for changing the filter 14d, condenser lenses 13 for collecting the illumination light to illuminate the object o, a stage 14a on which the object o is placed, sample stage drivers 14 that move the stage 14a along the optical axis for focusing, variable magnification lenses 15 for selecting magnification of the enlarged image, zoom lenses 16 for adjusting zooming of the enlarged image, a beam splitter 17 that divides the light from the object o into a light to be directly observed by the naked eye and a light to be output to an imaging instrument 3 (explained later) as imaging information, and eyepieces 18 that form an image for observing by the naked eye.

The light ray comes out from the illumination light source 11a passes through the filter 14d, is converged by the condenser lens 13, and illuminates the object o placed on the stage 14a. The light ray passed through the object o enlarging the image of the object o by the variable magnification lens 15 and the zoom lens 16 enters into the beam splitter 17. A portion of light ray entering into the beam splitter 17 is reflected and a portion of light ray passes through the beam splitter 17. The light ray passing through the beam splitter 17 is incident into the imaging instrument 3. On the other hand, the light ray reflected by the beam splitter 17 forms an image by the eyepiece 18 to be observed by an observer.

The light source controller 11, the filter changers 12, the sample stage drivers 14, the variable magnification lenses 15, and the zoom lenses 16 are controlled their movements by the microscope controller 20 through internal bus arranged in the microscope 2. In the microscope controller 20, an operating section (instruction means) 22 capable of carrying out various operations for the microscope unit 10 (such as an instruction to move the stage 14a upward/downward, and an instruction to turn a revolver) is arranged. Generally, the microscope unit 10 and the microscope controller 20 are integrally arranged in a housing 19. A power section 23 is arranged in the microscope controller 20 and supplied with power from utility power through a power line and the power is also supplied to the microscope unit 10.

The imaging instrument 3 is composed of a camera head unit 30 having a solid-state imaging device (CCD) that detects the enlarged image of the object O come out from the microscope unit 10 and a camera controller 40 that receives a detected signal output from the camera head unit 30 and outputs image information. The solid-state imaging device of the camera head unit 30 is located on the optical axis of the optical system of the microscope unit 10. Accordingly, the light passing through the beam splitter 17 forms an image on an imaging plane of the solid-state imaging device through an imaging lens (not shown).

The camera controller 40 receives a detected signal from the camera head unit 30 and outputs image information of the object o in which luminance and the like is adjusted on the basis of the detected signal. An operating section (instructing means) 42 that carries out operation for acquiring image information (release a shutter, change resolution, and the like) and that for displaying the acquired image information (LCD monitor display) is arranged in the camera controller 40. The operating section 42 may be integrally constructed with the camera controller 40 or constructed separately.

Since the camera head unit 30 is generally located above the microscope 2 (microscope unit 10), when the camera head unit 30 and the camera controller 40 are integrally constructed, operability becomes worse, so that the camera head unit 30 and the camera controller 40 are generally separately arranged. Accordingly, the camera head unit 30 and the camera controller 40 are connected by a connecting cable 51 and a detected signal detected by the solid-state imaging device of the camera head unit 30 is sent to the camera controller 40 through the connecting cable 51.

In the above-described microscope digital image acquiring system 1, in order to obtain image information of the object o, it is necessary that the microscope 2 and the imaging instrument 3 are operated cooperatively. In the present invention, in order to cooperatively operate the microscope 2 and the imaging instrument 3, the microscope controller 20 and the camera controller 40 are made to be able to operate independently without connecting an external controller such as a computer so as to control operations of the microscope unit 10 and to acquire and process detected signals from the camera head unit 30 by exchanging control command with each other.

In order to communicate control command and a controlled result by the control command with each other, a connecting cable 52 is arranged between the microscope controller 20 and the camera controller 40. The connecting cable 52 is connected to connectors 21 and 41 arranged on the microscope controller 20 and the camera controller 40, respectively. Incidentally, the connector 21 is arranged on the third interface 4c and the connector 41 is arranged on the second interface 4b.

Although power for driving the camera head unit 30 and the camera controller 40 may be supplied separately by arranging power sections on respective instruments to supply utility power, it is possible to construct to supply utility power supplied to the microscope controller 20 via the connecting cables 51 and 52 as shown in FIG. 2. In this construction, since the power line 23 is only one, it becomes easy to arrange instruments and handle cables.

In such connecting cables 51 and 52 for supplying power and communication (in particular, the connecting cable 52 for connecting the microscope 2 and the imaging instrument 3), a USB (Universal Serial Bus) standard cable (hereinafter called "USB cable") can be used to increase versatility. By the way, a connecting cable for communication is not limited to the USB cable and, for example, there are IEEE1394, LVDS, SCSI, LAN cable, and the like.

As an example of cooperative operation between the microscope 2 and the imaging instrument 3, there is focusing control by controlling operation of the stage 14a on the basis of the detected signal detected by the camera head unit 30, exposure control by controlling illuminance of the illumination light source 11a, and the like.

Figure 3:
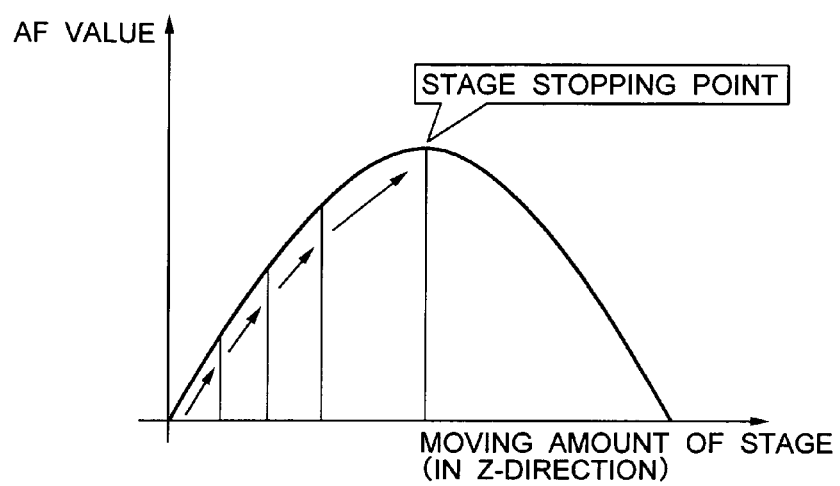
FIG. 3 is a graph showing a relation between a moving amount of a stage and focusing information (AF value) upon controlling focus.

In the case of focusing control, a focusing state (hereinafter the value showing the state of focusing is called as "focusing information (AF value)") of the optical system is obtained from the image contrast of the object o by using the detected signal from the camera head unit 30, and the stage 14a (sample stage drivers 14) is controlled so that AF value becomes maximum as shown in FIG. 3.

On the other hand, in the case of exposure control, an illuminance state (hereinafter called "light source intensity information (AE value)") of the optical system is similarly obtained from the image luminance of the object o by using the detected signal from the camera head unit 30, and the illuminance of the illumination light source 11a (light source controller 11) is adjusted (controlled) so that the illuminance state becomes optimum.

Figure 15:
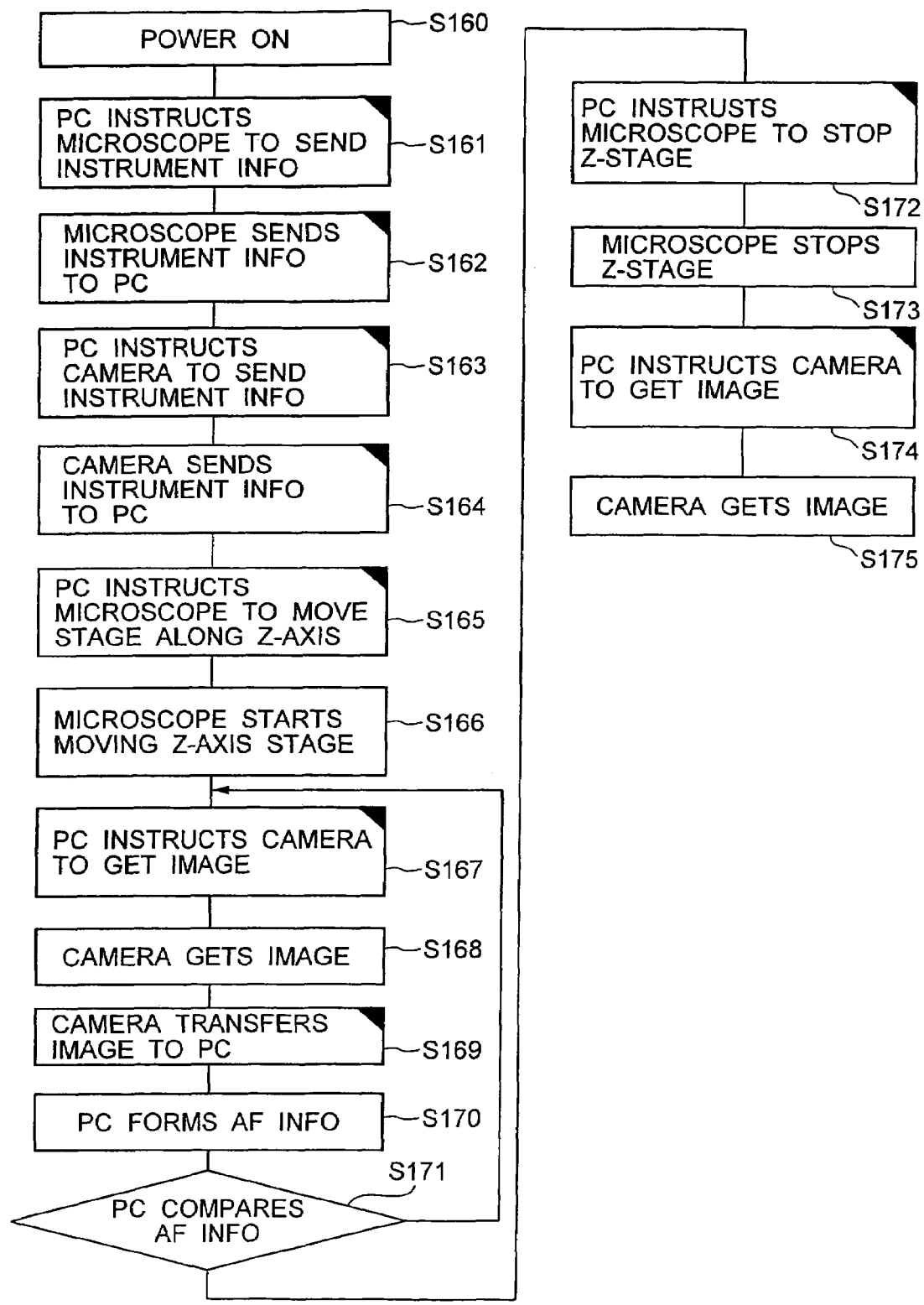
FIG. 15 is a flowchart showing conventional processes.

As described above, by constructing the microscope controller 20 and the camera controller 40 to operate cooperatively, communication operations between instruments shown by the blocks with a triangle mark at right upper side in the flowchart of a conventional system in FIG. 15 become unnecessary or reduce, so that processing of each instrument becomes simple, response becomes fast, and processing speed and operability can be increased as a whole. By arranging a central processing unit capable of carrying out real-time processing on the microscope controller 20 and the camera controller 40 and connecting both of the instruments 20 and 40 by an exclusive communication cable (such as connecting cable 52), both of the instruments 20 and 40 become possible to carry out real-time processing, so that it becomes possible to carry out cooperative operation such as focusing control by sending a control command to the microscope controller 20 on the basis of a focusing information (AF value) derived from the detected signal obtained by the camera controller 40 as described above.

Moreover, the number of cables connecting instruments with each other becomes fewer, so that it becomes easy to handle cables resulting in improving working efficiency upon setting instruments.

In this construction, when the microscope 2 and the imaging instrument 3 operate cooperatively, it is necessary to carry out initial setting that sets both of the instruments 2 and 3 to be optimum condition by communicating instrument information with each other, so that each of the microscope controller 20 and the camera controller 40 has an initial setting means that instrument information of one instrument is sent to the other instrument through the connecting cable 52 upon supplying power (start-up) so as to obtain instrument information of the other instrument each other. In particular, after supplying power the camera controller 40 sends a unit ID of the camera head unit 30 set in advance to the microscope controller 20 through the connecting cable 52. On the other hand, the microscope controller 20 sends a unit ID of the microscope unit 10 set in advance to the camera controller 40 through the connecting cable 52. The microscope controller 20 and the camera controller 40 received respective unit IDs set initial settings for the microscope unit 10 and the camera head unit 30 connected respectively to become optimum state. With this construction, since instrument information of respective instruments 2 and 3 are sent and set to each other upon supplying power to respective instruments 2 and 3, user can save labor to set in accordance with connected instrument, so that operability increases. Incidentally, when a unit ID of the other party cannot be obtained, initial setting is carried out in a given standard state.

Figure 4:
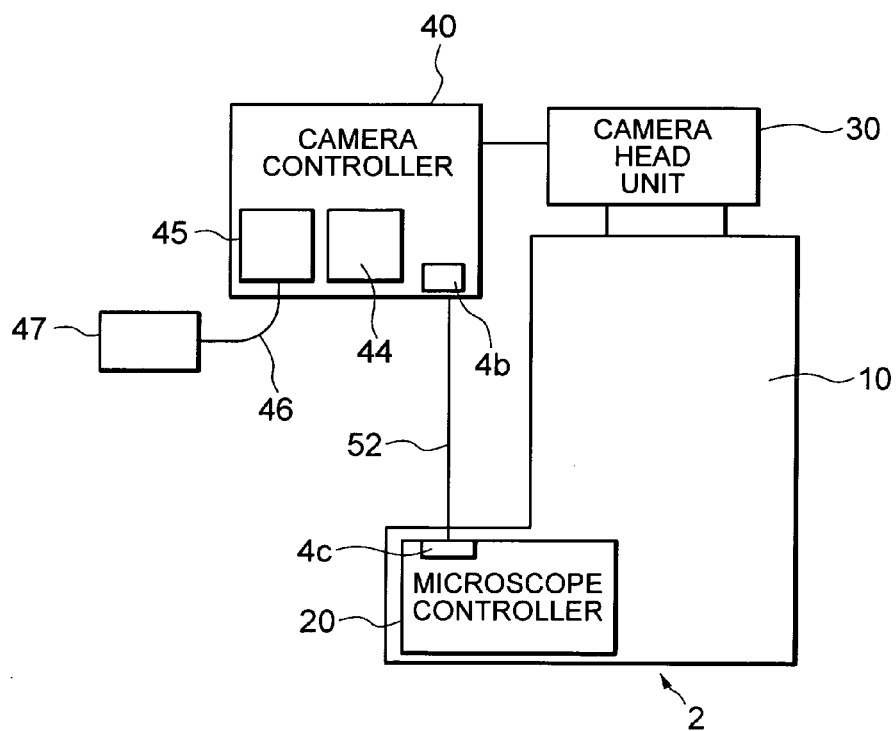
FIG. 4 is a block diagram showing a case that an internal memory or an external memory is arranged to a camera controller.

As shown in FIG. 4, image information of the object o obtained as described above can be stored in an internal memory (hard disk and the like) 44 arranged on the camera controller 40, and an external memory (flash memory, magneto-optical disk I/O drive, and the like) 47 connected to an external memory connector 45 through a cable 46, so that managing and using the acquired image information become easy. By the way, it becomes easy to manage and keep image information by storing information such as instrument information (exposure information such as exposure, exposure time, and the like) of the camera head unit 30, unit ID of the microscope unit 10 obtained through the connecting cable 52, light source, magnification, filter, and the like in connection with image information (packaged manner).

It is possible to construct such that a firmware for the microscope controller 20 is stored in advance in the internal memory 44 or (an external memory medium loaded on) the external memory 47 arranged on the camera controller 40 and the microscope controller 20 downloads the firmware stored in the internal memory 44 or the external memory 47 through the connecting cable 52 and rewrites the firmware of the microscope 2. As described above, by making it possible to download the firmware of the microscope 2 from the camera controller 40 and rewrite the firmware, it becomes easy to rewrite the firmware of the microscope 2.

As shown in FIG. 5, it is possible to construct such that the external controller 60 such as a computer is connected to the camera controller 40 or the microscope controller 20 through the first interface 4a or the fourth interface 4d and image information is obtained by sending a control command from the external controller 60. In this case, as for the external communication means with the external controller 60, there is a way for using LAN cables 61, 61*a*, and 61*b*, or USB cables 62, and 63.

Figure 5A:
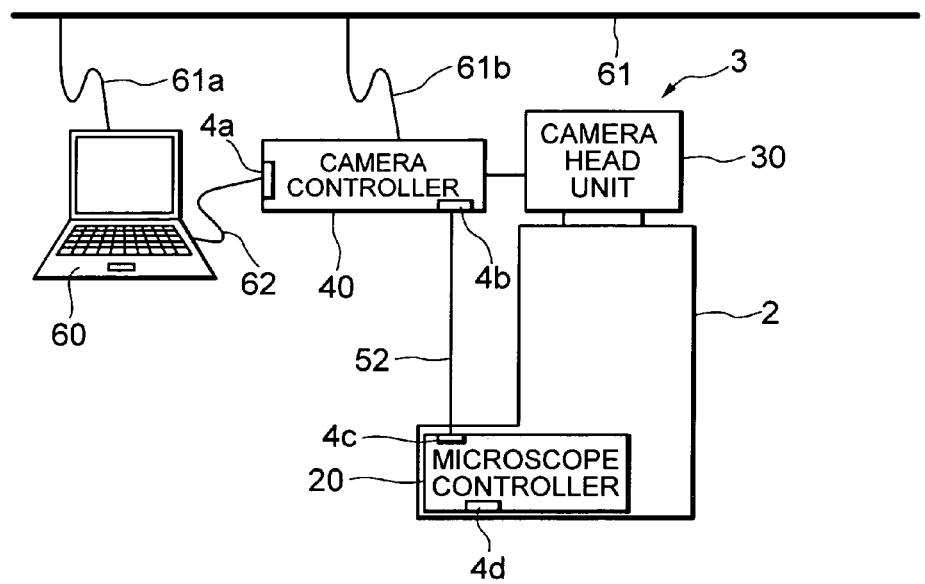
FIG. 5A is a block diagram showing that an external controller is connected by means of an external connection means and that an external controller is connected to a camera controller.

As shown in FIG. 5A, when the external controller 60 is connected to the camera controller 40 (the first interface 4*a*), the camera controller 40 receives the control command from the external controller 60 and a control command for the imaging instrument 3 is carried out by the camera controller 40 and a control command for the microscope 2 is sent from the second interface 4*b* to the microscope controller 20 through the connecting cable 52 and the third interface 4*c* and carried out by the microscope controller 20.

Figure 5B:
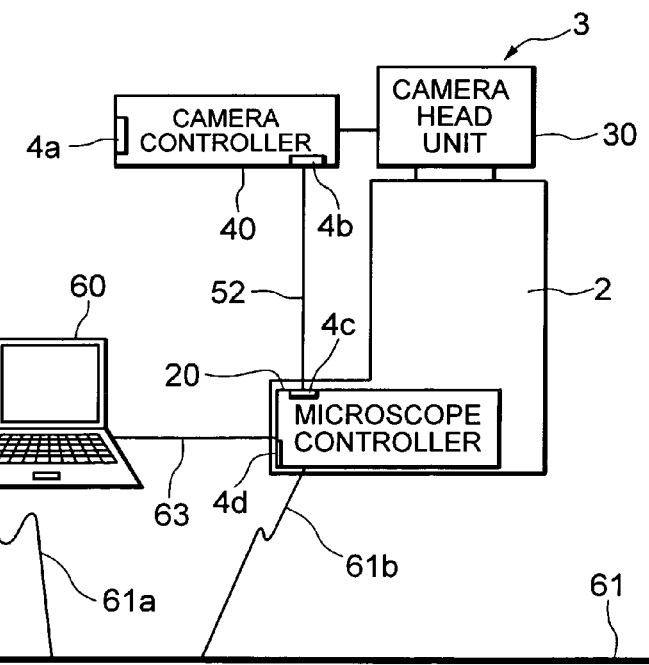
FIG. 5B is a block diagram showing that an external controller is connected by means of an external connection means and that an external controller is connected to a microscope controller.

Alternatively, as shown in FIG. 5B, when the external controller 60 is connected to the microscope controller 20 (the fourth interface 4*d*), the microscope controller 20 receives the control command from the external controller 60 and a control command for the microscope 2 is carried out by the microscope controller 20 and a control command for the imaging instrument 3 is sent from the third interface 4*c* to the camera controller 40 through the connecting cable 52 and the second interface 4*b* and carried out by the camera controller 40.

In this construction, since the microscope digital image acquiring system 1 can be operated from a remote place, the scope of access can be broadened. By the way, as for the external communication means, for example, IEEE1394, LVDS, and SCSI may be used.

Figure 6:
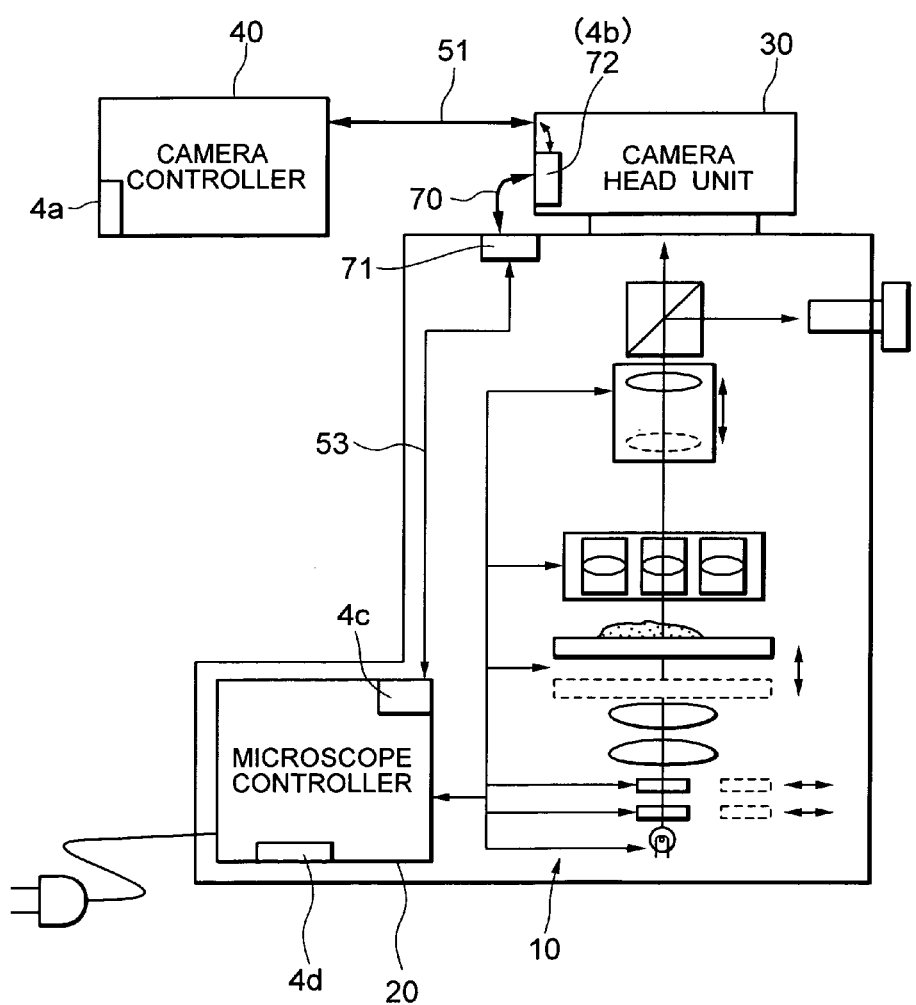
FIG. 6 is a block diagram showing that a camera head unit and a microscope controller are connected by a connection means.

In the system construction explained in FIG. 2, the case that the connecting cable 52 for connecting the microscope 2 and the imaging instrument 3 connects the microscope controller 20 and the camera controller 40 is explained. However, in the way to connect the microscope 2 and the imaging instrument 3, it is possible to construct as shown in FIG. 6 such that a connector 71 is arranged on the microscope controller 20, a connector 72 (the second interface 4*b*) is arranged on the camera head unit 30, and the connectors 71 and 72 are connected to the third interface 4*c* through a connecting cable 53. In this case, communication between the microscope controller 20 and the camera controller 40 is carried out through the connecting cable 51, the camera head unit 30, and the connecting cable 53. In this case, if the connecting cable 53 for connecting the microscope controller 20 and the camera head unit 30 is arranged in the housing 19 of the microscope 2 in advance, the number of cables upon setting the system 1 can be fewer, so that working efficiency increases.

As shown in FIG. 7, it is possible to construct such that a connector 70 (71, 72) arranged on the microscope 2 (housing 19) and the camera head unit 30, respectively, is arranged at one end of the connecting cable 53 and upon fitting the imaging instrument 3 (camera head unit 30) on the microscope 2, these connectors 71 and 72 contacts with each other so as to connect the microscope controller 20 and the camera head unit 30 with the connecting cable 53, so that working efficiency increases upon setting the system. By the way, in the case of FIG. 7, the connector 70 is separated into the connectors 71*a* and 72*a* for communication and connectors 71*b* and 72*b* for power supply.

Figure 8A:
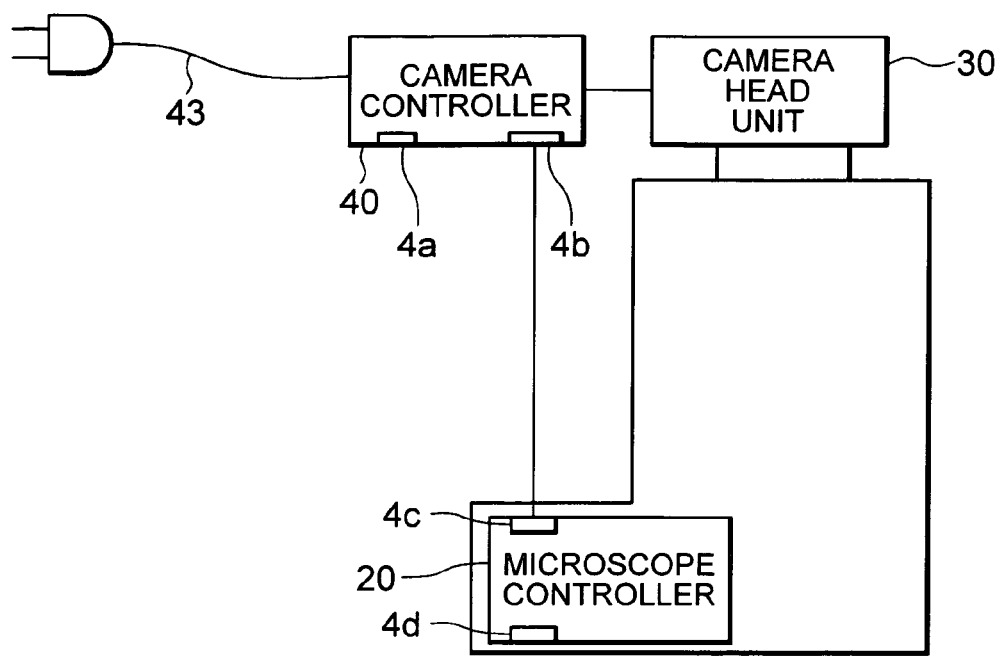
FIG. 8A is a block diagram showing that a power supply is arranged to a camera controller and that the camera controller and a microscope controller are connected by a connection means.
Figure 8B:
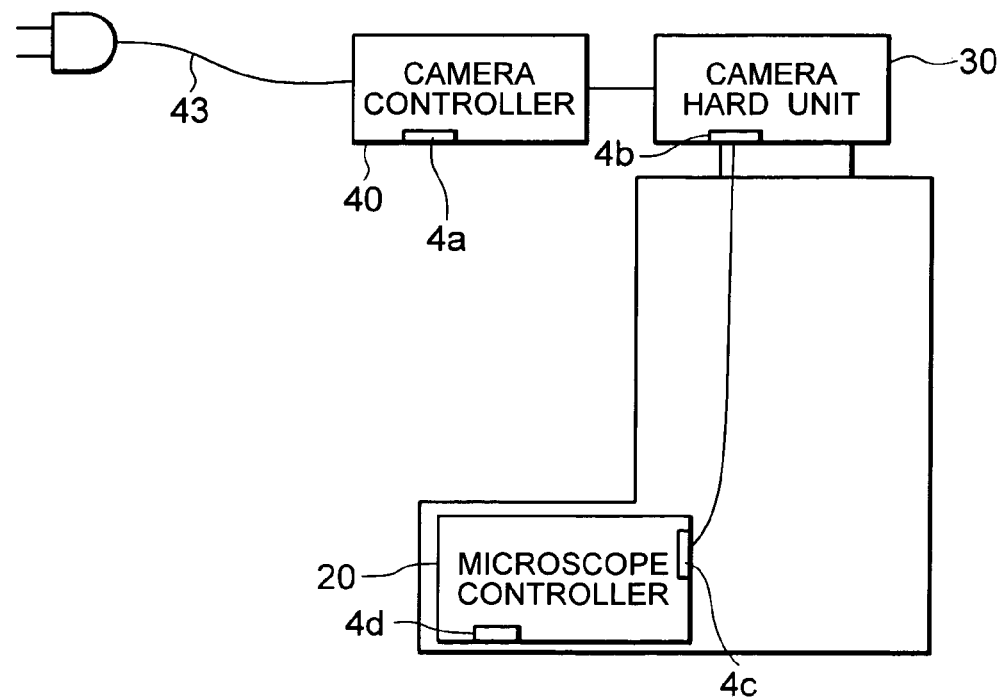
FIG. 8B is a block diagram showing that a power supply is arranged to a camera controller and that a camera head unit and a microscope controller are connected by a connection means.

In the system construction explained with reference to FIG. 2, although power is supplied from the microscope controller 20, it is possible to supply power from the camera controller 40 as shown in FIG. 8, so that power supplying means can be designed flexibly in accordance with system construction. In this case, according to the way of connecting the microscope 2 and the imaging instrument 3 there are two cases that the microscope 2 is supplied power from the camera controller 40 (see FIG. 8A) and that the microscope 2 is supplied power from the camera head unit 30 (see FIG. 8B).

EMBODIMENTS

In the microscope digital image acquiring system 1 constructed as described above, image information of the object o is acquired by exchanging control command between the microscope controller 20 and the camera controller 40. Embodiments of processing construction for acquiring image information are explained below.

First Embodiment

A flowchart according to a first embodiment of the present invention is shown in FIG. 9. In step S101, power is supplied to the microscope 2 and the imaging instrument 3. In step S102, a control command for instructing to send instrument information is sent from the camera controller 40 to the microscope controller 20. In step S103, in response to receiving the control command, the microscope controller 20 sends the instrument information of the microscope 2 to the camera controller 40. In step S104, the camera controller 40. sends a control command for starting focusing control to the microscope controller 20. In step S105, in response to receiving the control command, the microscope controller 20 starts focusing control to make the sample stage drivers 14 move the stage 14*a* along the optical axis. In step S106, the camera controller 40 obtains a detected signal from the camera head unit 30 and, in step S107, the camera controller 40 calculates AF information from the detected signal and sends the AF information to the microscope controller 20, and the steps S106 and S107 are repeated. On the other hand, in step S108, every time upon receiving AF information from the camera controller 40, the microscope controller 20 checks whether the stage 14*a* reaches the in-focus state or not from the AF information. in step S109, when the stage 14*a* reaches in-focus state, the microscope controller 20 stops the stage 14*a*. In step S110, the microscope controller 20 sends a control command for acquiring image information to the camera controller 40. In step Sill, upon receiving the control command, the camera controller 40 stops sending AF information (S106, S107) and outputs image information of the object o by using the detected signal from the camera head unit 30.

In this construction, since control command is sent from the camera controller 40 to the microscope controller 20 and focusing control can be carried out on the microscope controller 20 side, processing can be simplified in comparison with the conventional method (see FIG. 15). Moreover, by setting focusing function (S105, S108, and S109) in the microscope controller 20 and sending a control command from the camera controller 40, the microscope controller 20 and the camera controller 40 operate cooperatively, so that processes are broken up to become easy to control resulting in increasing response. Accordingly, processing speed and operability increase as a whole.

Second Embodiment

Figure 10:
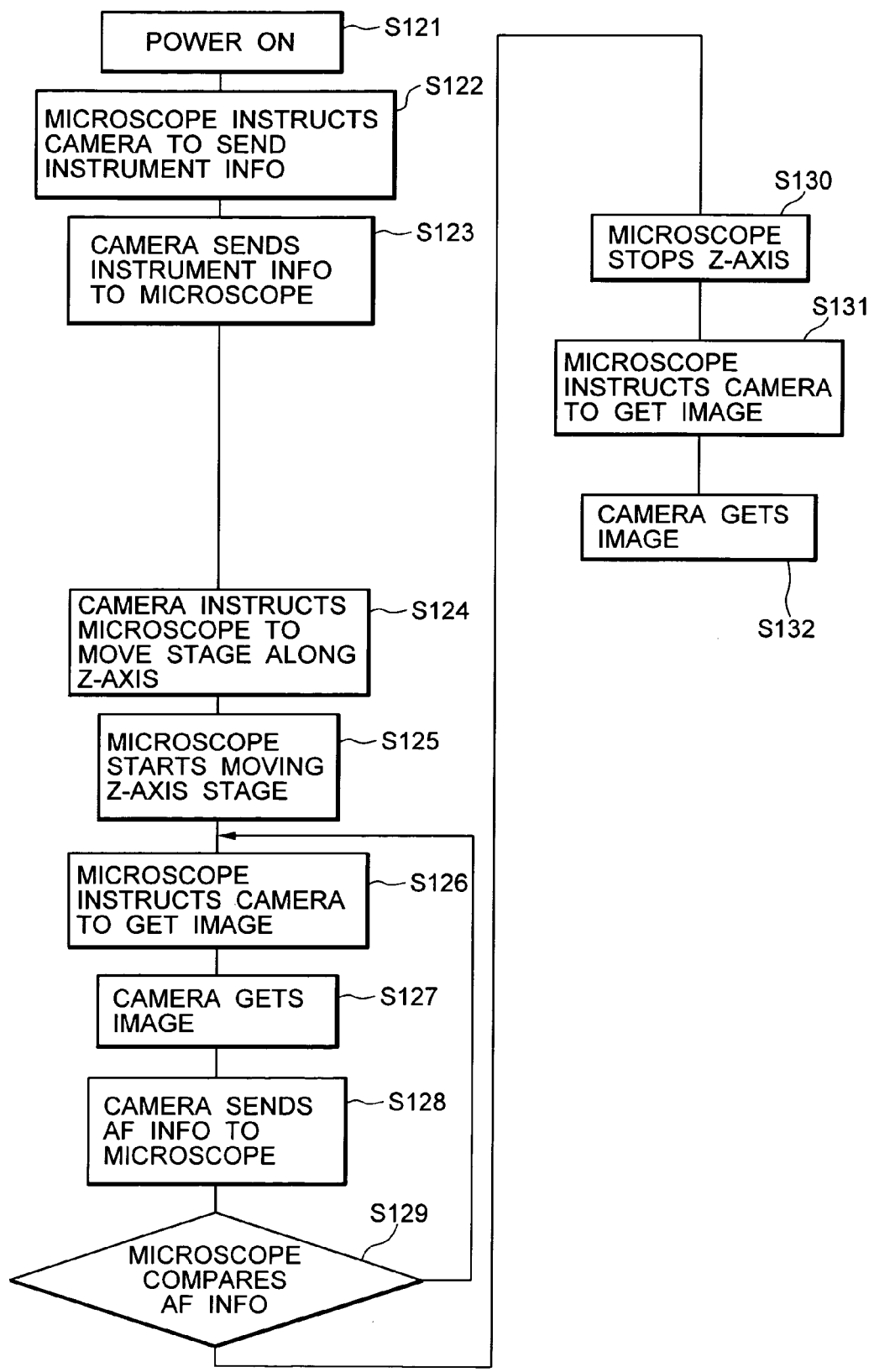
FIG. 10 is a flowchart showing processes according to a second embodiment of the present invention.

A flowchart according to a second embodiment is shown in FIG. 10. In the first embodiment, although processing starts from process of the camera controller 40, in the second embodiment, processing starts from process of the microscope controller 20. In step S121, power is supplied. In step S122, the microscope controller 20 sends to the camera controller 40 a control command for instructing to send instrument information of the imaging instrument 3. In step S123, the camera controller 40 sends the instrument information of the imaging instrument 3. In step S124, the camera controller 40 sends a control command for starting focusing control to the microscope controller 20. In step S125, in response to receiving the control command for starting focusing control, the microscope controller 20 starts focusing control to make the sample stage drivers 14 move the stage 14a along the optical axis. In step S126, the microscope controller 20 sends a control command to calculate AF information to the camera controller 40. In step S127, in response to receiving the control command to calculate AF information, the camera controller 40 obtains detected signal from the camera head unit 30. In step S128, the camera controller 40 calculates AF information from the detected signal and send AF information to the microscope controller 20. In step S129, upon receiving AF signal, the microscope controller 20 checks whether the stage 14a reaches in-focus state or not. When the stage 14a does not reach the in-focus state, the flow goes back to step S126. When the stage 14a reaches the in-focus state, the flow goes to step S130 and the stage 14a is stopped. In step S131, the microscope controller 20 sends a control command to acquire image information to the camera controller 40. In step S132, upon receiving the control command, the camera controller 40 acquires detected signal from the camera head controller 30 and outputs image information of the object O.

In the second embodiment, the system is constructed such that a focus information calculating function (S127, and S128) for calculating AF information is arranged on the camera controller 40 and AF information is acquired by sending a control command from the microscope controller 20 to the camera controller 40. In this construction also, processing can be simplified in comparison with the conventional method (see FIG. 15). The microscope controller 2 and the camera controller 40 communicate control command with each other and both of the instruments operate cooperatively, so that processes are broken up to become easy to control resulting in increasing response. Accordingly, processing speed and operability can be increased as a whole.

Third Embodiment

Figure 11:
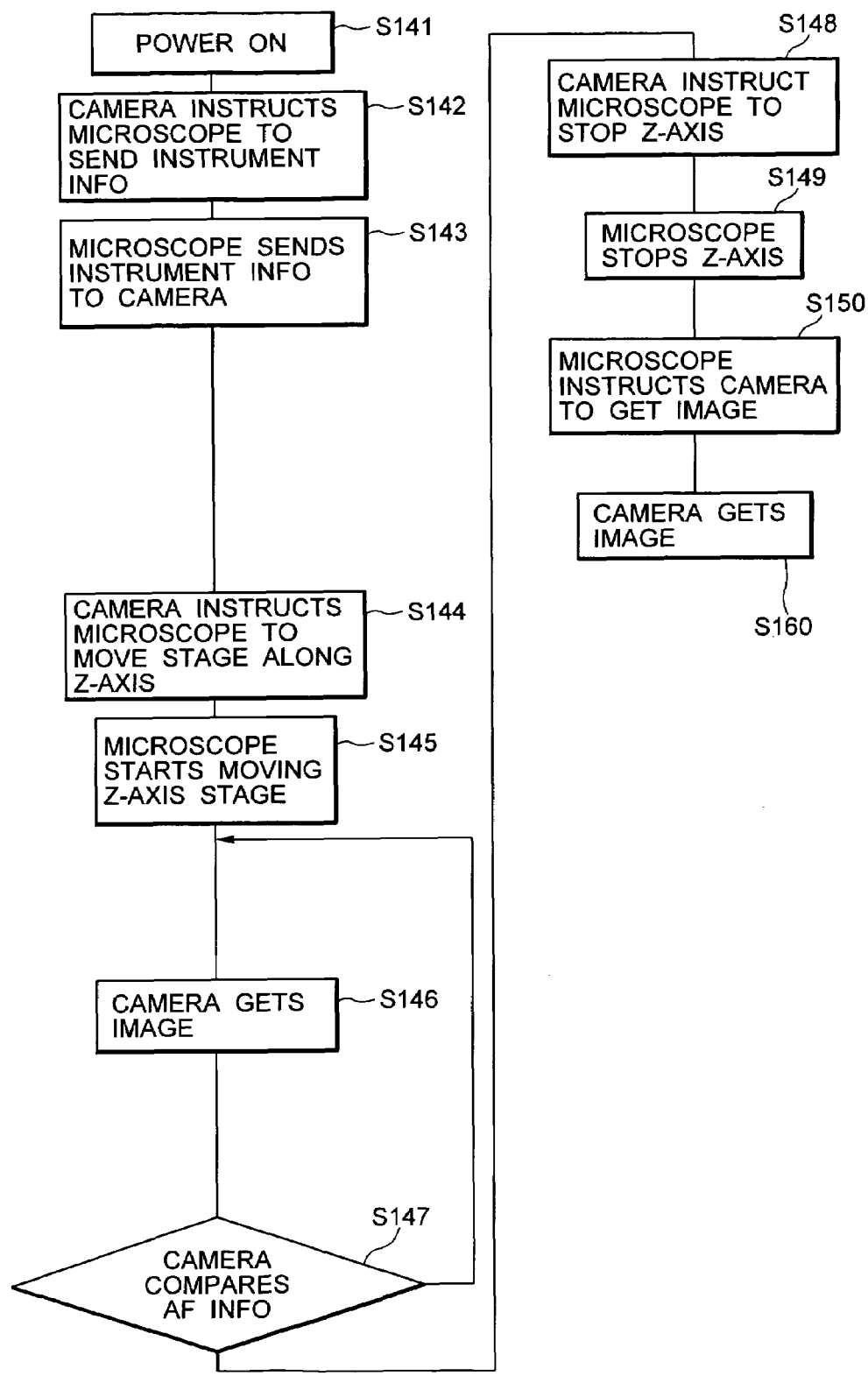
FIG. 11 is a flowchart showing processes according to a third embodiment of the present invention.

A flowchart according to a third embodiment is shown in FIG. 11. In step S141, power is supplied. In step S142, the camera controller 40 sends to the microscope controller 20 a control command for instructing to send instrument information. In step S143, the microscope controller 20 sends instrument information to the camera controller 40. In step S144, the camera controller 40 sends a control command for starting focusing control to the microscope controller 20. In step S145, upon receiving the control command, the microscope controller 20 moves the stage 14a along the optical axis by means of the sample stage drivers 14. In step S146, when the stage 14a starts moving, the camera controller 40 obtains detected signal from the camera head unit 30. In step S147, the camera controller 40 calculates AF information from the detected signal and checks whether the stage 14a has reached an in-focus state or not. The steps S146 and S147 are repeated until the stage 14a reaches the in-focus state. In step S148, when it is judged that the stage 14a is in-focus state, the camera controller 40 sends a control command for instructing to stop the stage 14a to the microscope controller 20. In step S149, upon receiving the control command for instructing to stop, the microscope controller 20 stops the stage 14a and, in step S150, sends a control command for instructing to acquire image information to the camera controller 40. In step S151, upon receiving the control command, the camera controller 40 acquires a detected signal from the camera head unit 30 and outputs image information of the object O.

In the third embodiment, upon focusing control, whether the stage 14a is to be stopped or not is judged only by the camera controller 40, so that the processing becomes simpler than the first and second embodiments.

Fourth Embodiment

As shown in FIG. 5A, an external controller 60 (such as a PC) is connected to the first interface 4a of the camera controller 40. A control command from the external controller 60 is received by the camera controller 40. A control command to the imaging instrument 3 is carried out by the camera controller 40. A control command to the microscope 2 is sent to the microscope controller 20 from the second interface 4b through the connecting cable 52 and the third interface 4c and the microscope 2 is controlled by the microscope controller 20.

In this case, since the camera controller 40 can find out the control command of the microscope 2 sent to the microscope controller 20, the setting of the camera head unit 30 can be changed in accordance with the control command. An example of the flowchart of this case is shown in FIG. 12.

Figure 12:
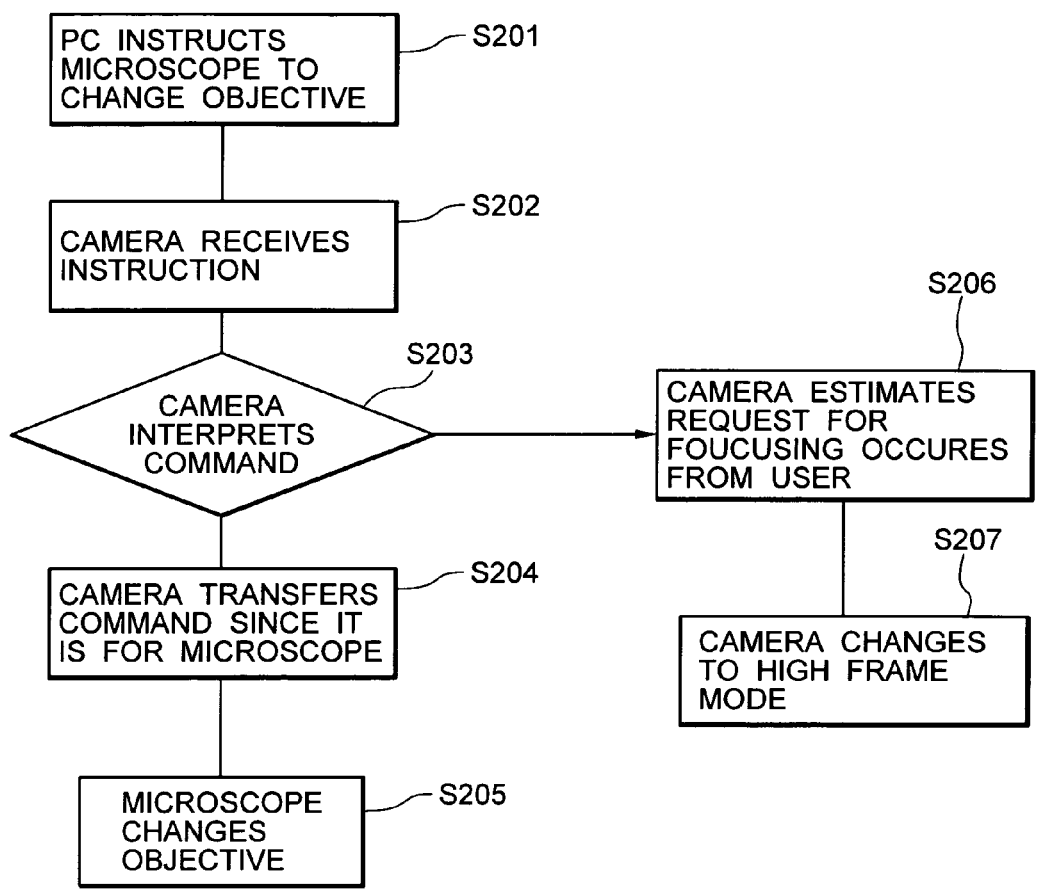
FIG. 12 is a flowchart showing processes according to a fourth embodiment of the present invention.

In FIG. 12, in step S201, for example, a control command for changing an objective of the microscope 2 is issued from the external controller 60. In step S202, the control command is sent to the camera controller 40. In step S203, the camera controller 40 interprets the control command. In step S204, since the control command is for the microscope controller 20, the camera controller 40 passes the control command to the microscope controller 20 through the second interface 4b and the third interface 4c. In step S205, the microscope controller 20 changes the objective of the microscope 2 in accordance with the control command.

In step S206, in this case, since the camera controller 40 has already interpreted the control command, the camera controller 40 estimates that user's request for focusing control occurs upon changing the objective of the microscope 2. In step S207, the camera controller 40 changes mode to a high frame rate in order to allow the user to focus without trouble.

In this manner, the contents of the control command sent from the external controller 60 to the microscope controller 20 is interpreted by the camera controller 40, so that it becomes possible to set the state of the camera head unit 30 preferable to the user without further instruction given from the user.

Figure 13:
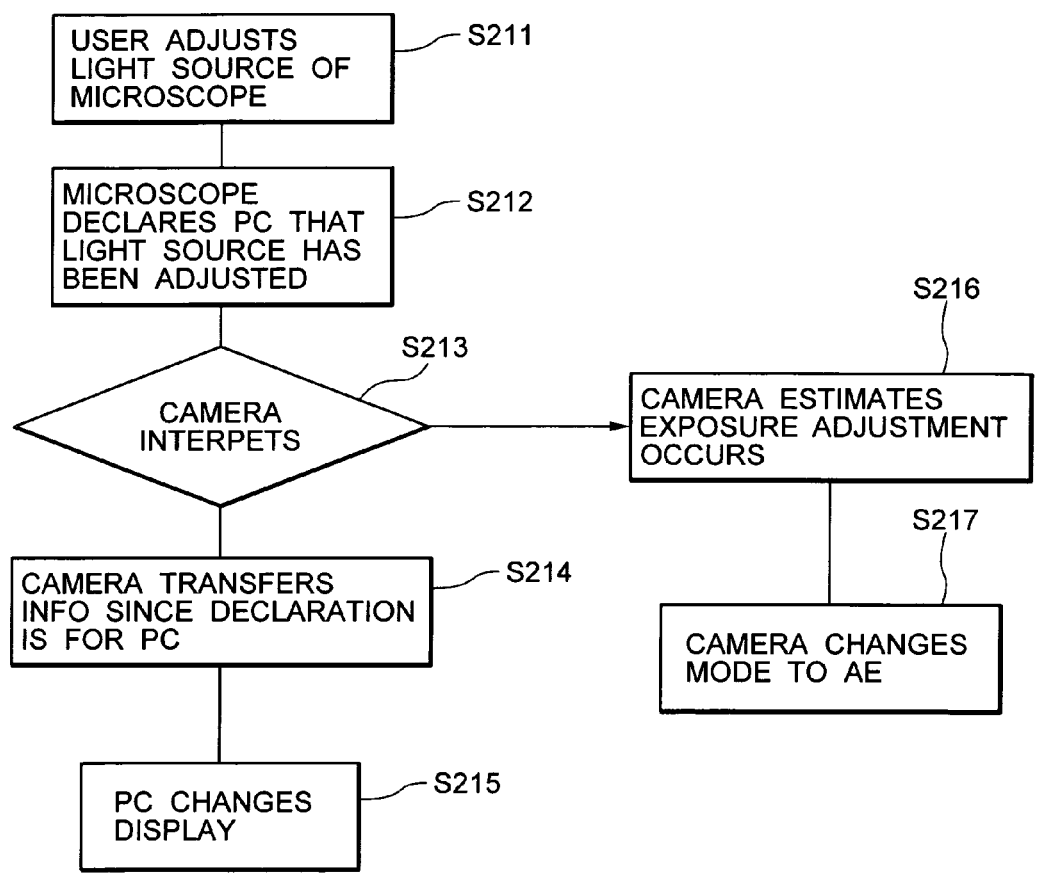
FIG. 13 is another flowchart showing processes according to a fourth embodiment of the present invention.
Figure 14:
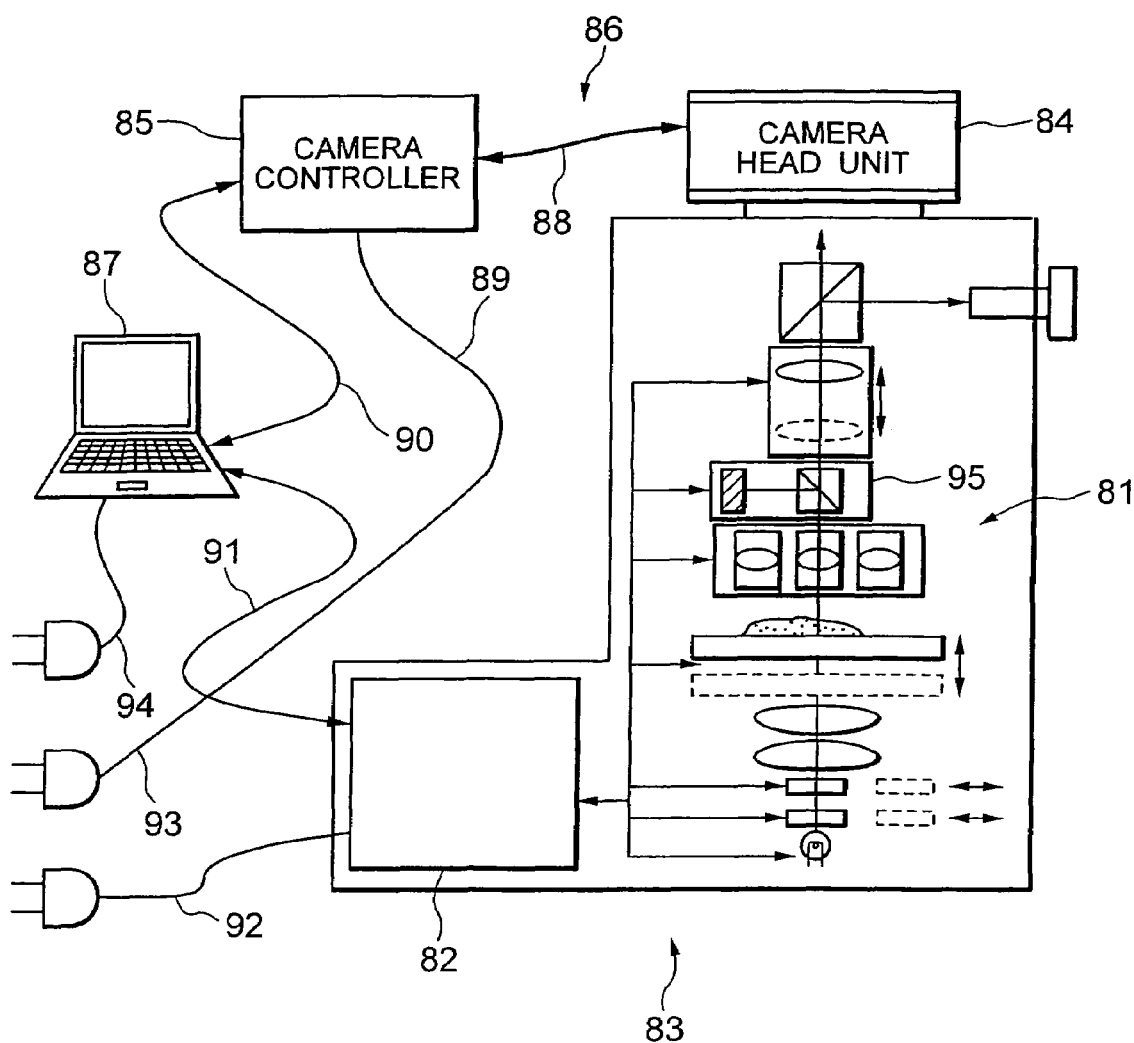
FIG. 14 is a block diagram showing a conventional microscope digital image acquiring system.

In the fourth embodiment, when a user directly operates the microscope 2, the state alteration information is sent from the microscope controller 20 to the camera controller 40 through the third interface 4c and the second interface 4b and to the external controller 60 through the first interface 4a. In this instance, it may be constructed such that by detecting the above-described state alteration, the camera controller 40 adapts the camera head unit 30 suitable to the state. FIG. 13 is an example of flowchart for such case.

As shown in FIG. 13, in step S211, when a user adjusts the light source of the microscope 2, in step S212, that the light source has been adjusted is sent to the external controller 60 through the microscope controller 20. In step S213, the information is detected and interpreted by the camera controller 40 and, in step S214, transferred to the external controller 60 as a command. In step S215, upon receiving the command, the external controller 60 changes display in accordance with the contents of the command.

In step S216, in this instance, since the camera controller 40 has already interpreted the contents of the command, the camera controller 40 estimates that exposure adjustment will occur to the camera head unit 30, so that, in step S217, the camera controller 40 changes the AE mode of the camera head unit 30 in order to allow the user to observe without trouble.

As described above, it becomes possible that when a user has directly operated the microscope 2, the contents of the command from the microscope controller 20 to the external controller 60 is interpreted by the camera controller 40 and the state of the camera head unit 30 is set to the state preferable to the user.

In the above-described first through fourth embodiments, although it is explained that the focusing control is carried out by moving the stage 14a of the microscope unit 10, in exposure control also, it is possible to construct such that functions are broken up into the microscope controller 20 and the camera controller 40 and the microscope controller 20 and the camera controller 40 are controlled cooperatively. For example, the camera controller 40 obtains a detected signal from the camera head unit 30, calculates an AE value (light intensity information), sends a control command on the basis of the AE value to the microscope controller 20, and controls the light source controller 11. Alternatively, it is realized such that a control command is sent from the microscope controller 20 to the camera controller 40 to make the camera controller 40 calculate an AE value by the light source intensity information calculation function of the camera controller 40, and the microscope controller 20 controls the light source controller 11 on the basis of the AE value. As described above, when the exposure control is broken up into the microscope controller 20 and the camera controller 40, the processing becomes simple, so that processing speed can be increased. Moreover, by cooperatively carrying out control of the light source controller 11 on the basis of the AE value and exposure time control of the imaging device of the camera head unit 30, more delicate exposure control is possible, so that dynamic range of the image information can be broadened.

The operation to acquire a digital image (image information) of the microscope 2 is not related to the above-described processing, and may be constructed to operate from the operating section 22 arranged on the microscope controller 20 or the operating section 42 arranged on the camera controller 40.

As described above, in a microscope digital image acquiring system according to the present invention, a microscope controller and a camera controller are constructed to operate cooperatively by connecting the microscope controller and the camera controller with a communication means to communicate control command with each other. Accordingly, processes are broken up into the instruments and communicating processes between the instruments reduces resulting in increasing response, so that processing speed and operability increase as a whole system. Furthermore, since the number of cables and the like connecting instruments with each other reduces, it becomes easy to handle cables, so that working efficiency increases upon arranging instruments.

The invention claimed is:

1. A microscope digital image acquiring system comprising:

a microscope that is composed of a microscope unit that is constructed by an optical system forming an enlarged image of an object, and a microscope controller that is connected to the microscope unit and controls operations of the microscope unit;

an imaging instrument that is composed of a camera head unit that is removably attached to the microscope and has an imaging device detecting the enlarged image output from the optical system, and a camera controller that is connected to the camera head unit, and controls operations of the camera head unit, the camera controller being a different controller than the microscope controller and being physically separated from the microscope controller such that the imaging instrument is operable independently from the microscope when the camera head unit is removed from the microscope;

a connector that is provided in either one of the microscope or the imaging instrument;

a movement instruction means that is connected to the connector provided in the either one of the microscope or the imaging instrument and thus is connected to either one of the microscope controller or the camera controller and outputs a movement instruction signal through the connector to the system and carries out movement instruction to the system; and a communication means that is connected to the camera controller and the microscope controller and executes communication between the camera controller and the microscope controller;

wherein one of the controllers connected to the movement instruction means judges whether the movement instruction should be executed by the controller or the movement instruction should be transferred to the other controller through the communication means to be executed by the other controller and operates cooperatively with each other through the communication means.

2. The microscope digital image acquiring system according to claim 1, wherein the microscope unit has a focusing instrument that makes the optical system focus on the object, and the microscope controller has a focusing function that makes the optical system focus on the object by controlling the position of the focusing instrument on the basis of a control command and wherein the camera controller calculates defocusing deviation information for focusing the optical system from the detected signal obtained from the camera head unit and makes the optical system focus on the object by the focusing function by sending the control command to the microscope controller on the basis of the focusing information.

3. The microscope digital image acquiring system according to claim 1, wherein the microscope unit has an illumination means for illuminating the object and the microscope controller has an illumination adjusting function that adjusts illuminance by controlling the illumination means on the basis of a control command and wherein the camera controller calculates light intensity information for adjusting illuminance of the illumination means from the detected signal obtained from the camera head unit, sends the control command to the microscope controller on the basis of the light source information, and adjusts illuminance by the illumination adjusting function.

4. The microscope digital image acquiring system according to claim 1, wherein the microscope unit has a focusing instrument that makes the optical system focus on the object, and the camera controller has a focusing information calculating function that calculates focusing information for making the optical system focus on the object from the detected signal obtained from the camera head unit on the basis of a control command and wherein the microscope controller sends the control command to the camera controller, makes the camera controller calculate the defocusing deviation information by the focusing information calculating function, and controls the position of the focusing instrument on the basis of the focusing information to make the optical system focus on the object.

5. The microscope digital image acquiring system according to claim 1, wherein the microscope unit has an illumination means for illuminating the object, and the camera controller has a light source intensity information calculating function that calculates light source intensity information for adjusting illuminance of the illumination means from the detected signal obtained from the camera head on the basis of a control command and wherein the microscope controller sends the control command to the camera controller, makes the camera controller calculate the light source intensity information by the light source intensity information calculating function, and adjusts illuminance on the basis of the light source intensity information.

6. The microscope digital image acquiring system according to claim 1, wherein the communication means has a pair of connectors, one of the connectors is arranged on the microscope, and the other connector is arranged on the imaging instrument, and wherein the system is constructed such that upon connecting the imaging instrument to the microscope, the communication means is connected by the connectors.

7. The microscope digital image acquiring system according to claim 1, wherein the communication means is constructed by a USB cable.

8. The microscope digital image acquiring system according to claim 1, wherein the camera controller has an internal memory and wherein the camera controller stores in the internal memory the instrument information of the imaging instrument and that of the microscope obtained through the communication means in connection with the image information of the object output from the imaging device.

9. The microscope digital image acquiring system according to claim 8, wherein the microscope controller obtains a firmware for the microscope controller stored in the internal memory in advance through the communication means and rewrites the firmware of the microscope controller.

10. The microscope digital image acquiring system according to claim 1, wherein the camera controller has an external memory and wherein the camera controller stores in the external memory the instrument information of the imaging instrument and that of the microscope obtained through the communication means in connection with the image information.

11. The microscope digital image acquiring system according to claim 10, wherein the microscope controller obtains a firmware for the microscope controller stored in the external memory in advance through the communication means and rewrites the firmware of the microscope controller.

12. The microscope digital image acquiring system according to claim 1, wherein each of the microscope and the imaging instrument has an initial setting means that carries out initial setting by exchanging unit ID with each other by using the communication means.

13. The microscope digital image acquiring system according to claim 1, wherein the imaging instrument has a first interface that receives the movement instruction from the movement instruction means and a second interface that sends the movement instruction to the microscope.

14. The microscope digital image acquiring system according to claim 13, wherein the imaging instrument controls the camera head unit in response to the movement instruction to detect an enlarged image of the object, and controls the microscope through the second interface.

15. The microscope digital image acquiring system according to claim 13, wherein the microscope has a fourth interface that receives the movement instruction from the movement instruction means, and a third interface that sends the movement instruction to the camera head unit.

16. The microscope digital image acquiring system according to claim 15, wherein the microscope controls the movement of the microscope in response to the movement instruction to form an enlarged image of the object, and controls the imaging instrument through the third interface.

17. The microscope digital image acquiring system according to claim 13, wherein the microscope has a fourth interface that receives the movement instruction from the movement instruction means, a third interface that sends the movement instruction to the camera head unit, and a signal line that directly connects the second interface and the third interface, and wherein the imaging instrument and the microscope operate cooperatively.

* * * * *